US009584355B2

(12) United States Patent
Tang et al.

(10) Patent No.: US 9,584,355 B2
(45) Date of Patent: Feb. 28, 2017

(54) DEVICE AND METHOD FOR FREQUENCY OFFSET ESTIMATION

(71) Applicant: Intel mobile Communications GmbH, Neubiberg (DE)

(72) Inventors: Yunshuai Tang, Xi'an Shaanxi Province (CN); Yanzeng Fu, Xi'an Shaanxi Province (CN); Hong Zhang, Xi'an Shaanxi Province (CN); Zhen Wang, Xi'an Shaanxi Province (CN); Zhe Xu, Xi'an Shaanxi Province (CN); Jie Lei, Xi'an Shaanxi Province (CN)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 14/233,366

(22) PCT Filed: Mar. 25, 2013

(86) PCT No.: PCT/CN2013/000342
§ 371 (c)(1),
(2) Date: Jul. 17, 2015

(87) PCT Pub. No.: WO2014/153677
PCT Pub. Date: Oct. 2, 2014

(65) Prior Publication Data
US 2015/0319027 A1    Nov. 5, 2015

(51) Int. Cl.
*H04L 27/26*    (2006.01)
*H04B 17/26*    (2015.01)
(Continued)

(52) U.S. Cl.
CPC ......... *H04L 27/2675* (2013.01); *H04B 17/26* (2015.01); *H04L 25/022* (2013.01);
(Continued)

(58) Field of Classification Search
CPC ... H03D 3/22; H04B 1/00; H04B 7/00; H04B 7/216; H04B 17/26; H04J 3/00;
(Continued)

(56) References Cited

U.S. PATENT DOCUMENTS

| 7,599,282 | B2 * | 10/2009 | Jones, IV | ............ H04L 27/2675 370/208 |
| 2003/0053559 | A1 * | 3/2003 | Chen | ...................... C30B 25/18 375/316 |

(Continued)

*Primary Examiner* — Shawkat M Ali
(74) *Attorney, Agent, or Firm* — Schwegman Lundberg & Woessner, P.A.

(57) ABSTRACT

A device and method for estimating a frequency offset of a received signal is provided. The device comprises: a plurality of phase estimation units, each of the plurality of phase estimation units adapted for receiving one of a plurality of data parts of the received signal and estimating a phase caused by the frequency offset from the received data part, wherein the plurality of data parts comprises payload data and known symbols in the received signal. A method for estimating the frequency offset is also provided; and a frequency offset estimation unit for estimating the frequency offset from a plurality of phases estimated by the plurality of phase estimation units.

17 Claims, 10 Drawing Sheets

(51) Int. Cl.
*H04L 25/02* (2006.01)
*H04L 27/00* (2006.01)

(52) U.S. Cl.
CPC .... *H04L 27/0014* (2013.01); *H04L 2027/003* (2013.01); *H04L 2027/004* (2013.01); *H04L 2027/0016* (2013.01); *H04L 2027/0061* (2013.01)

(58) Field of Classification Search
CPC .. H04J 11/00; H04K 1/00; H04K 1/10; H04L 1/02; H04L 7/00; H04L 7/02; H04L 12/26; H04L 23/02; H04L 25/02; H04L 25/022; H04L 25/08; H04L 27/06; H04L 27/22; H04L 27/26; H04L 27/2625; H04L 27/28; H04W 24/00

USPC ........ 370/203, 208, 252, 335, 342; 375/232, 375/260, 267, 316, 329, 330, 343, 344, 375/348, 359
See application file for complete search history.

(56) References Cited

U.S. PATENT DOCUMENTS

| | | | | |
|---|---|---|---|---|
| 2003/0185180 | A1* | 10/2003 | Min | H04L 27/38 370/336 |
| 2004/0066862 | A1* | 4/2004 | Kim | H04L 27/22 375/329 |
| 2004/0246891 | A1* | 12/2004 | Kay | H04L 27/0008 370/215 |
| 2005/0008108 | A1* | 1/2005 | Peng | H04L 27/0014 375/344 |
| 2006/0251190 | A1* | 11/2006 | Wang | H04L 27/0014 375/330 |
| 2007/0002823 | A1* | 1/2007 | Skov Andersen | H04B 7/2656 370/349 |
| 2007/0160158 | A1* | 7/2007 | Zeng | H04L 27/2657 375/260 |
| 2008/0240311 | A1* | 10/2008 | Piirainen | H04L 27/2657 375/344 |
| 2008/0273641 | A1* | 11/2008 | Yang | H04L 5/023 375/359 |
| 2012/0087447 | A1* | 4/2012 | Yoon | H04L 27/2675 375/343 |
| 2012/0307871 | A1* | 12/2012 | Schaffner | H04L 27/103 375/139 |

* cited by examiner

DEVICE AND METHOD FOR FREQUENCY OFFSET ESTIMATION

TECHNICAL FIELD

The present invention relates generally to telecommunication systems and in particular to a device and a method for estimating a frequency offset.

BACKGROUND OF THE INVENTION

A base station is the core component in a telecommunication system. Ideally, both the base station and a mobile terminal should transmit or receive signal using a perfect crystal whose frequency accuracy is perfectly good. Due to cost, temperature, and other affects, however, there is some bias between the crystal frequencies of the base station and the mobile terminal. Furthermore, there are Doppler effects and the mobile terminal has temperature drift. As a result, there is a frequency difference between the carrier frequency of the received signal and the frequency of local crystal. Without compensation, the frequency difference will degrade the performance of the mobile terminal greatly. So the frequency offset estimation followed by frequency offset compensation is very important in the mobile terminal in order to maintain good performance of the mobile terminal. A need exists to improve the accuracy and stability of frequency offset estimation in telecommunication systems.

BRIEF DESCRIPTION OF THE INVENTION

It can be achieved by providing a device for estimating a frequency offset. The device comprises a plurality of phase estimation units, each of the plurality of phase estimation units adapted for receiving one of a plurality of data parts of the received signal and estimating a phase caused by the frequency offset from the received data part, and a frequency offset estimation unit for estimating the frequency offset from a plurality of phases estimated by the plurality of phase estimation units. The plurality of data parts comprises payload data and known symbols in the received signal.

There are some known symbols transmitted in telecommunication systems, such as the training sequence code (TSC) and tail symbols in a GSM (Global System for Mobile Communications) system. By using known symbols in frequency offset estimation, bad effects caused by erroneously decoded bits are mitigated. Thus, the accuracy and stability of frequency offset estimation may be improved. It provides another benefit in a communication system such as GSM system. Because tail symbols are located at the very beginning and the very end of a burst, the distance between the left tail symbols and the right tail symbols is the largest in the distances between any two data parts in the burst. The variance of estimated frequency offset is inversely proportional to the square of the distance. So using the tail bits may reduce the variance of estimated frequency offset greatly.

BRIEF DESCRIPTION OF THE DRAWINGS

The accompanying drawings constitute a part of this specification. In the drawings.

DETAILED DESCRIPTION

Figure 1A:
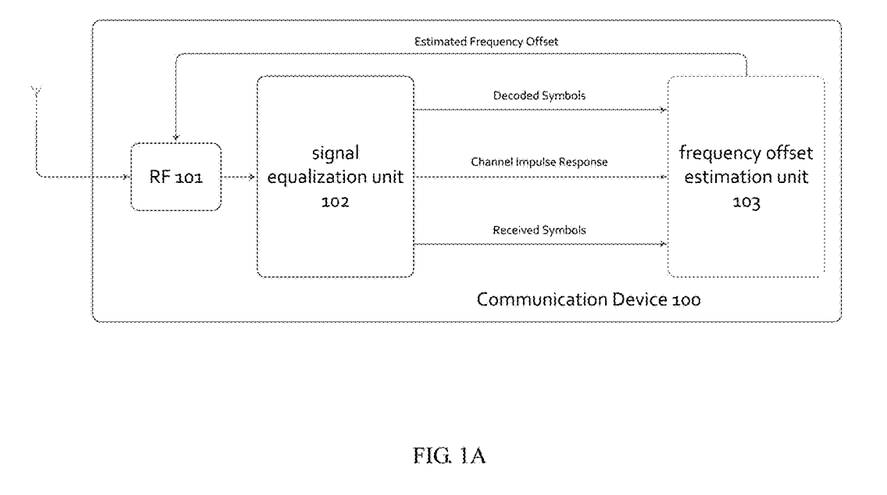
FIG. 1A illustrates a communication device having a frequency offset estimation unit.

FIG. 1A illustrates a communication device 100 having a frequency offset estimation module. The communication device 100 may be a mobile terminal. An antenna receives a signal transmitted from a base station and the RF (Radio Frequency) unit 101 suppresses noise or interferences of the received signal and converts the received signal from a radio frequency signal to a baseband signal. Then a signal equalization unit 102 estimates the channel impulse response that the received signal has undergone, cancels the ISI (inter-symbol-interference), and decodes the received signal to hard decoded symbols. A frequency offset estimation unit 103 estimates the frequency offset applied to the received signal by utilizing hard decoded symbols, estimated channel impulse response, and received signal output from the signal equalization unit 102. The estimated frequency offset may be output to the RF unit 101 again for a further process.

Figure 1B:
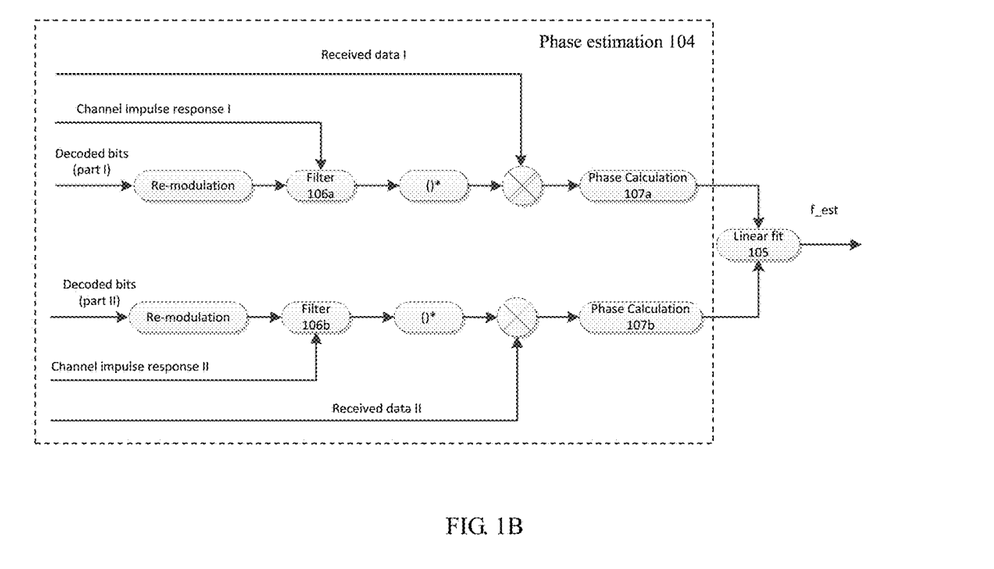
FIG. 1B illustrates the structure of the frequency offset estimation unit in FIG. 1A.

FIG. 1B illustrates the structure of the frequency offset estimation unit 103 in FIG. 1A. The frequency offset estimation unit 103 comprises a phase estimation block 104 having an upper branch and a lower branch and a linear fit block 105. Decoded bits are partitioned into two parts in the signal equalization unit 101 and input the upper branch and the lower branch respectively. The two parts of decoded bits are re-modulated and then filtered by the filter block 106a, 106b with the channel impulse response output from the signal equalization unit 101. The output of the filter block 106a, 106b should be identical with the corresponding received payload data if a frequency offset in the received payload data is not considered. So the product of the received payload data and the conjugation of the output of the filter block 106a, 106b conveys phase information which is caused only by the frequency offset. In a phase calculation block 107a, 107b, the phase of the product is calculated. Since each part of decode bits contains many bits, there are plurality of phases calculated for each part. At last, the phases of the upper branch and the lower branch are fed into the linear fit block 105 where frequency offset is estimated by using linear fit technique.

This solution may introduce a lot of noise by the direct calculation of phases of the product of the received payload data and the conjugation of the filtered result, especially when the received signal is polluted by strong co-channel or adjacent interference, or when the received signal is suffering from serious fading. Meanwhile, many erroneously decoded bits caused under the extremely bad wireless conditions will make the estimated frequency offset quite unreliable. Furthermore, phase calculation is a non-linear operation, so it may amplify the noise contained in the real/imaginary part of the received payload data. The direct calculation of phases of the products may also induce too much noise in the phases and consequently in the estimated frequency offset, so that the estimated frequency offset is not quite accurate.

Figure 2:
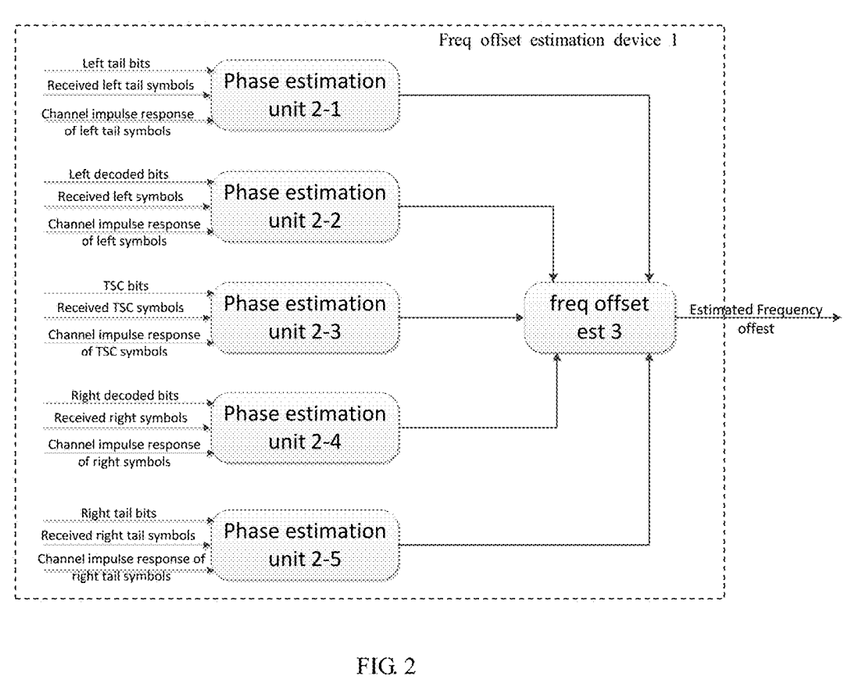
FIG. 2 illustrates an exemplary device for frequency offset estimation.

FIG. 2 illustrates an exemplary frequency offset estimation device 1. Unlike the solution as illustrated in FIG. 1A in which phases are estimated only from the decoded bits and received payload data, the frequency offset estimation device 1 comprises five phase estimation units 2-1, 2-2, 2-3, 2-4 and 2-5, each of which estimates phases from a part of data. Not only the right part of and the left part of payload data, but also right tail symbols, training sequence code (TSC) symbols and left tail symbols are taken into frequency offset estimation. So there are totally five parts of data and each of the phase estimation units 2-1, 2-2, 2-3, 2-4 and 2-5 will generate an estimated phase from one of the five parts of data.

In particular, phase estimation unit 2-1 receives left tail bits, received left tail symbols and channel impulse response of left tail symbols for filtering. Phase estimation unit 2-2 receives left decoded bits, received left symbols, and channel impulse response of left symbols for filtering. Phase estimation unit 2-3 receives Training Sequence Code (TSC) bits, received TSC symbols and channel impulse response of TSC symbols. Phase estimation unit 2-4 receives right decoded bits, received right symbols, and channel impulse response of right symbols for filtering. Phase estimation unit 2-5 receives right tail bits, received right tail symbols and channel impulse response of right tail symbols for filtering.

Each of the phase estimation units 2-1, 2-2, 2-3, 2-4 and 2-5 may estimate a phase from one of the five parts of data in a similar manner as described with reference to FIGS. 1A-1B. Then the five estimated phases are fed into the frequency offset estimation unit 3 which will estimate the final frequency offset from the five estimated phases. In one example, a weighted average method may be used to calculate the final estimated phase, in which each of the five estimated phases is assigned with a different weighting factor and an averaged estimated phase is obtained. The averaged estimated phase may be used to estimate the final frequency offset.

Figure 3:
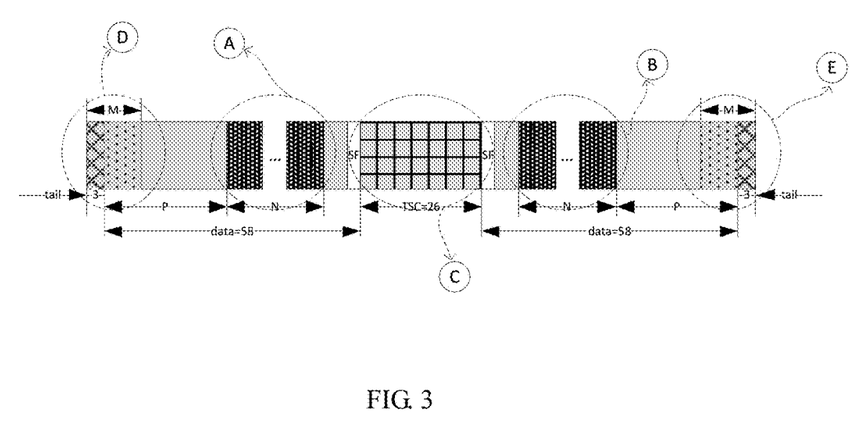
FIG. 3 illustrates an exemplary patch with five parts of data.

FIG. 3 illustrates an exemplary patch with five parts of data used in the exemplary frequency offset estimation device 1. The exemplary patch is a part of a burst in a communications system, such as GSM system, in which A, B, C, D, E represent the five parts of data for estimating the frequency offset, respectively. "A" represents N symbols in the left payload data segment of the burst. "B" represents N symbols in the right payload data segment of the burst. "C" represents the full TSC part which is in the center of the burst. "D" represents the left tail symbols of the burst. "E" represents the right tail symbols of the burst.

Each of the five parts of data may be inputted to one of phase estimation units 2-1, 2-2, 2-3, 2-4 and 2-5 as described in connection with FIG. 2 to obtain an estimated phase.

FIG. 3 only provides one exemplary patch of a communication system such as GSM system. The phase estimation method may be used in other telecommunication systems as long as similar known symbols are available, such as a telecommunication system according to IEEE 802.11b.

Figure 4:
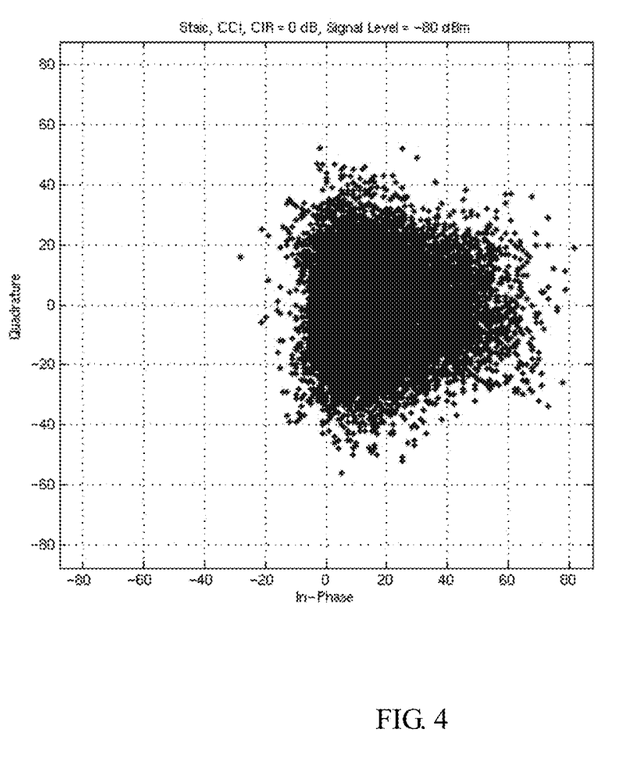
FIG. 4 illustrates constellation diagram of products which convey phase information to be estimated.
Figure 5:
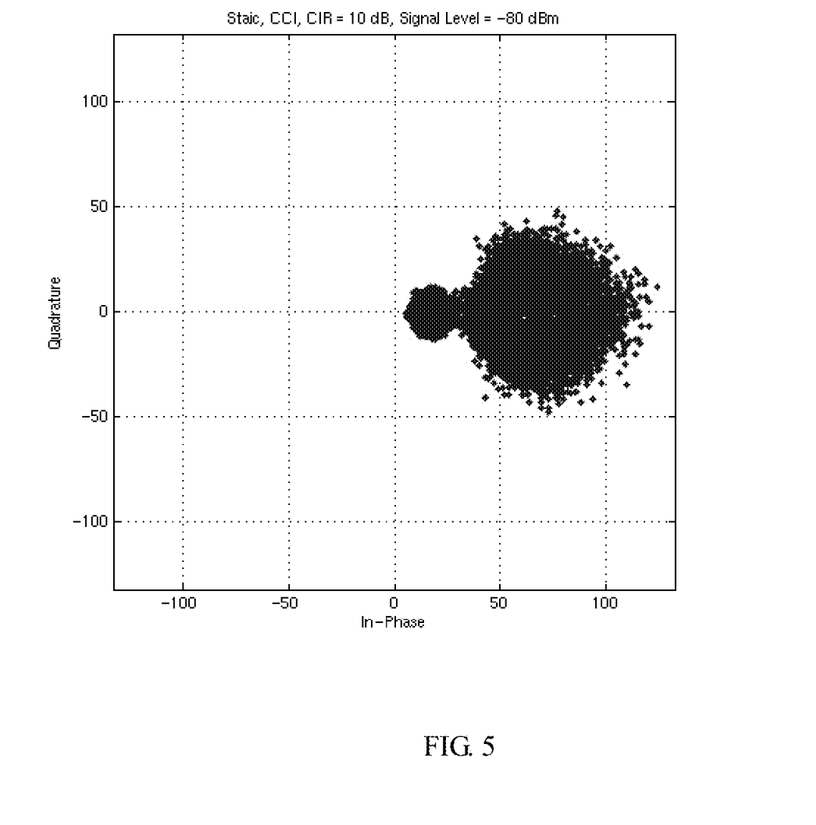
FIG. 5 illustrates another constellation diagram of the products in FIG. 4.

As illustrated with the multiplier 7 in FIG. 1B, the product of the received payload data and the conjugation of the output of the filter block conveys phase information which is caused only by the frequency offset. FIGS. 4 and 5 illustrate constellation diagram of the products with carrier-to-interferer ratio (CIR) of 0 dB and 10 dB, respectively. These products are obtained under good wireless conditions (static channel, co-channel interference, signal level =−80 dBm, frequency offset=30 Hz).

From FIG. 4 and FIG. 5, it is illustrated that the constellation of the products is not centrally distributed around the original point. The constellation aggregates at the positive half of I-rail. By comparing FIG. 4 and FIG. 5, the real part of the product will become smaller with the increasing of interference. Therefore, the real part of the product may be used as a metric to represent Signal to Noise Ratio of the product. A larger real part means a higher SNR. Therefore, by gating the product with a predetermined threshold, the product with low SNR can be discarded. Only the product whose real part exceeds the predetermined threshold is taken into phase estimation.

Figure 6:
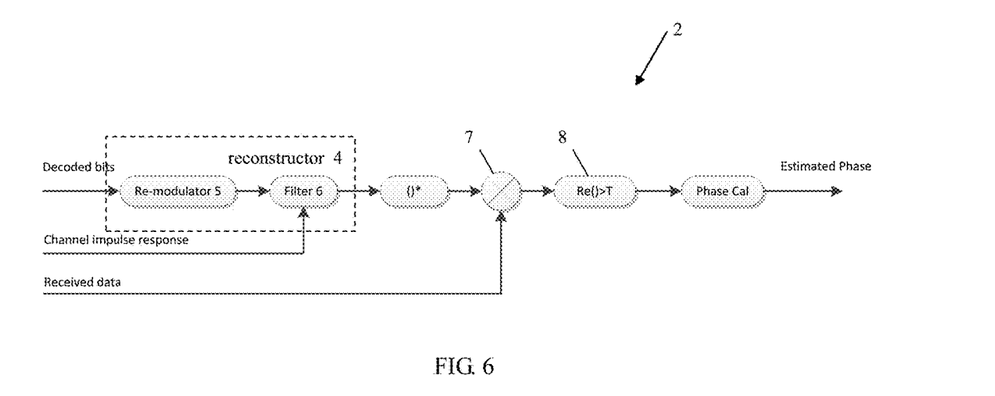
FIG. 6 illustrates an exemplary phase estimation unit with a gating unit.

FIG. 6 illustrates an exemplary phase estimation unit 2 with a gating unit 8. The exemplary phase estimation unit 2 comprises a reconstruction unit 4 which remodulates the inputted left tail bits, left decoded bits, TSC bits, right decoded bits and right tail bits of the five parts of data in a remodulator 5 and filters them with a channel impulse response of the respective data part in a filter 6. Then the output of the filter 6 is conjugated and inputted to a combiner 7, which generates a product of the conjugated output with the respective received data part. The gating unit 8, which is depicted with a mathematics inequality representation Re( )>T, gates the product with a predetermined threshold that only applies to the real part of the product, wherein Re( ) represents the real part and T represents the predetermined threshold. The product is then used to calculate the estimated phase.

In one example, the gating unit 8 may be used in one or more or all of the five phase estimation units 2-1, 2-2, 2-3, 2-4 and 2-5.

Figure 7:
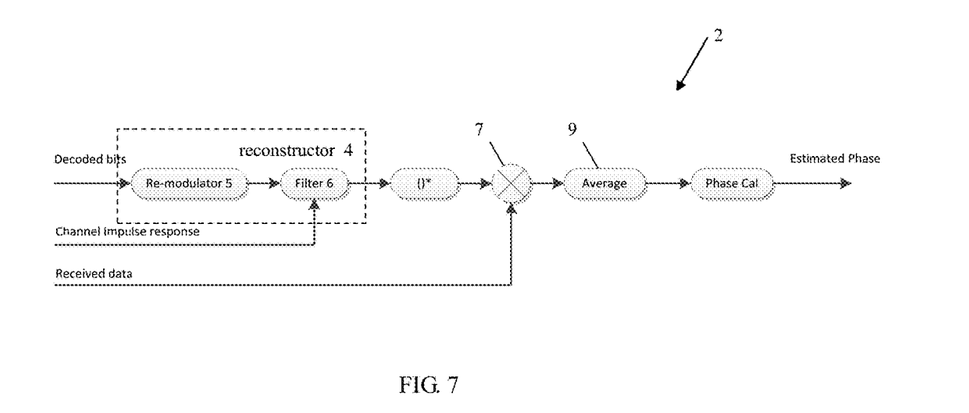
FIG. 7 illustrates an exemplary phase estimation unit with an averaging unit.

FIG. 7 illustrates an exemplary phase estimation unit 2 with an averaging unit 9. The phase estimation unit as illustrated in FIG. 7 comprises most of the same components as the phase estimation unit as illustrated in FIG. 6, except that the averaging unit 9 replaces the gating unit 8. The averaging unit 9 averages a plurality of products generated by the combiner 7.

Instead of directly calculating phase from each product, a plurality of products is averaged and then a phase is estimated for the plurality of products. The noise may have been suppressed a lot after the averaging, so the phase calculation based on the averaging result is more accurate. Moreover, phase estimation is usually resource consuming. Instead of each product having one phase estimation, the averaging unit 9 allows a single phase estimation for a plurality of products which are involved in one averaging. So if the averaging is performed every N products, N-1 phase estimations can be saved.

In one example, the averaging unit 9 may be used in one or more or all of the five phase estimation units 2-1, 2-2, 2-3, 2-4 and 2-5.

Figure 8:
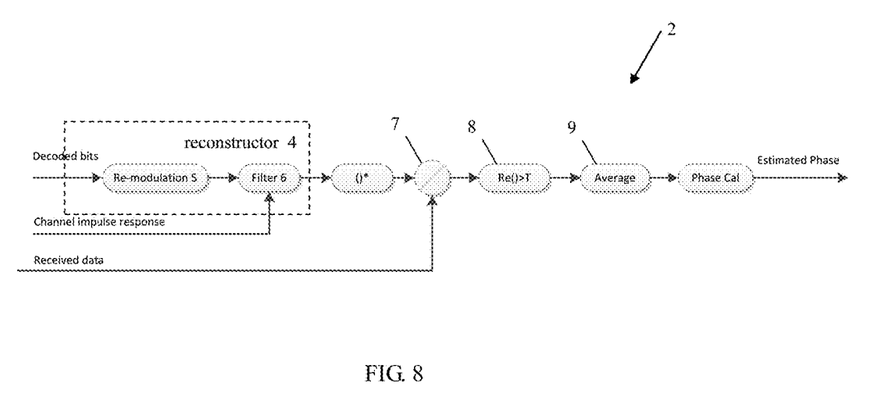
FIG. 8 illustrates an exemplary phase estimation unit with both a gating unit and an averaging unit.

FIG. 8 illustrates an exemplary phase estimation unit 2 with both a gating unit 8 and an averaging unit 9. The phase estimation unit 2 as illustrated in FIG. 8 comprises most of the same components as the phase estimation unit 2 as illustrated in FIG. 6, except that an averaging unit 9 is added after the gating unit 8. Here, a plurality of products generated by the combiner 7 are gated by the gating unit 8 and then averaged by the averaging unit 9.

Similarly, the gating unit 8 and averaging unit 9 may be used in one or more or all of the five phase estimation units 2-1, 2-2, 2-3, 2-4 and 2-5.

Figure 9:
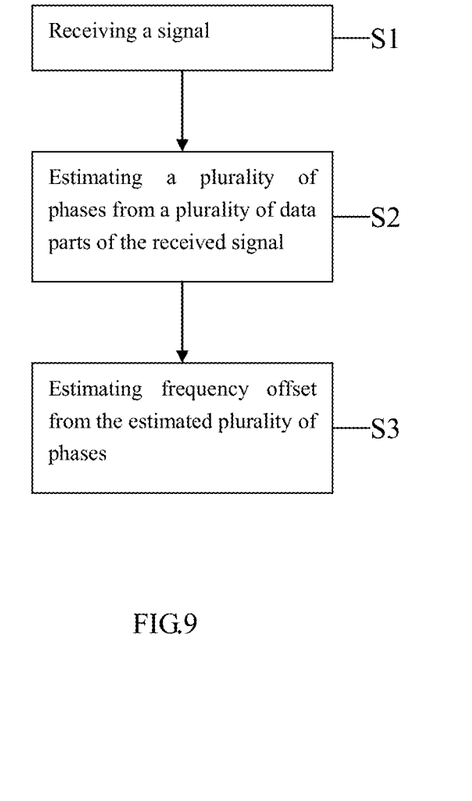
FIG. 9 illustrates an exemplary flow diagram of a method for frequency offset estimation.

FIG. 9 illustrates an exemplary flow diagram of a method for frequency offset estimation which can be implemented in the frequency offset estimation device 1 as illustrated in FIG. 2.

In a step S1, a signal transmitted from the base station is received by the mobile terminal. Due to the crystal frequencies between the base station and the mobile terminal and other affects, there is a frequency offset between the carrier frequency of the received signal and the frequency of local crystal.

Then, in a step S2, a phase caused by the frequency offset is estimated from each of a plurality of data parts of the received signal. In one example, there are five parts of data of the received signal, which is illustrated in detail in FIG. 2. The phase estimation may be implemented in each of the phase estimation units 2-1, 2-2, 2-3, 2-4, and 2-5.

In particular, the inputted left tail bits, left decoded bits, TSC bits, right decoded bits and right tail bits of the five parts of data are remodulated in remodulator 5 and filtered with a channel impulse response of the respective data part in filter 6. Then the output of the filter 6 is conjugated and multiplied with the respective received data part in combiner 7. The product may be gated in gating unit 8 with a predetermined threshold which only applies to the real part of the product. Alternatively or additionally, a plurality of products may be averaged in averaging unit 9. The resulting product is then used to calculate the estimated phase.

At last, in a step S3, a frequency offset may be estimated from the estimated plurality of phases in a frequency offset estimation unit 3. In particular, each of the five estimated phases is assigned with a different weighting factor and an averaged estimated phase is obtained. Then the averaged estimated phase may be used to estimate the final frequency offset by using linear fit technique.

Variations are described in the present disclosures and these variations should not be regarded as a departure from the spirit and scope of the disclosure, and any such modification as obvious to one skilled in the art are intended for inclusive within the scope of the appended claims.

The invention claimed is:

1. A mobile terminal for estimating a frequency offset of a signal, comprising:
   an antenna configured to receive the signal comprising a plurality of data parts, wherein the plurality of data parts comprise payload data and known symbols, and wherein the mobile terminal is configured to:
   decode the received signal;
   reconstruct the plurality of data parts by remodulating and filtering the plurality of data parts and output a plurality of reconstructed data parts;
   generate a product of the plurality of the data parts with a conjugation of the plurality of reconstructed data parts;
   calculate a plurality of phases from the product generated for each of the plurality of the data parts; and
   estimate the frequency offset from the plurality of phases.

2. The mobile terminal according to claim 1, wherein the mobile terminal is further configured to gate the with a predetermined threshold.

3. The mobile terminal according to claim 2, wherein the mobile terminal is further configured to average a plurality of gated products.

4. The mobile terminal according to claim 1, wherein the mobile terminal is further configured to average a generated plurality of products.

5. The mobile terminal according to claim 1, wherein the mobile terminal is implemented in a Global System for Mobile Communications (GSM) system.

6. The mobile terminal according to claim 1, wherein the known symbols comprise left and right tail symbols.

7. The mobile terminal according to claim 1, wherein the known symbols further comprise a training sequence code.

8. A method for estimating a frequency offset of a signal, comprising:
   receiving the signal, by a mobile terminal, comprising a plurality of data parts, wherein the plurality of data parts comprise payload data and known symbols;
   decoding the received signal;
   reconstructing the plurality of data parts by remodulating and filtering the plurality of data parts and outputting a plurality of reconstructed data parts;
   generating a product of the plurality of the data parts with a conjugation of the plurality of reconstructed data parts;
   calculating a plurality of phases from the product generated for each of the plurality of the data parts; and
   estimating the frequency offset from the plurality of phases.

9. The method according to claim 8, wherein estimating the plurality of phases further comprises gating the product generated for each of the plurality of the data parts with a predetermined threshold.

10. The method according to claim 9, wherein estimating the plurality of phases further comprises averaging a plurality of products gated for each of the plurality of the data parts.

11. The method according to claim 8, wherein estimating the plurality of phases further comprises averaging a plurality of products generated for each of the plurality of the data parts.

12. The method according to claim 8, wherein the method is implemented in a Global System for Mobile Communications (GSM) system.

13. The method according to claim 8, wherein the known symbols comprise right and left tail symbols.

14. The method according to claim 8, wherein the known symbols further comprise a training sequence code.

15. A non-transitory, computer program product comprising program codes, which, when run on a computer, causes the computer to perform a method, the method comprising:
   receiving a signal, by a mobile terminal, comprising a plurality of data parts, wherein the plurality of data parts comprise payload data and known symbols;
   decoding the received signal;
   reconstructing the plurality of data parts by remodulating and filtering the plurality of data parts and outputting a plurality of reconstructed data parts;
   generating a product of the plurality of the data parts with a conjugation of the plurality of reconstructed data parts;
   calculating a plurality of phases from the product generated for each of the plurality of the data parts; and
   estimating the frequency offset from the plurality of phases.

16. The non-transitory, computer program product according to claim 15, wherein estimating the plurality of phases further comprises gating the product generated for each of the plurality of the data parts with a predetermined threshold.

17. The non-transitory, computer program product according to claim 15, wherein estimating the plurality of phases further comprises averaging a plurality of products generated for each of the plurality of the data parts.

* * * * *